(12) United States Patent
Aida

(10) Patent No.: US 9,143,845 B2
(45) Date of Patent: Sep. 22, 2015

(54) BRANCHING UNITS AND POWER LINE MONITORING METHODS

(71) Applicant: Ryuji Aida, Tokyo (JP)

(72) Inventor: Ryuji Aida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/353,012

(22) PCT Filed: Sep. 21, 2012

(86) PCT No.: PCT/JP2012/074189
§ 371 (c)(1),
(2) Date: Apr. 18, 2014

(87) PCT Pub. No.: WO2013/094266
PCT Pub. Date: Jun. 27, 2013

(65) Prior Publication Data
US 2014/0308036 A1 Oct. 16, 2014

(30) Foreign Application Priority Data
Dec. 22, 2011 (JP) ................................. 2011-281354

(51) Int. Cl.
*H04B 13/02* (2006.01)
*H04Q 11/00* (2006.01)
*H04B 3/44* (2006.01)
*H04B 10/80* (2013.01)

(52) U.S. Cl.
CPC ............. *H04Q 11/0005* (2013.01); *H04B 3/44* (2013.01); *H04B 10/806* (2013.01)

(58) Field of Classification Search
CPC .... H04Q 11/0005; H04B 3/44; H04B 10/806; H04B 10/808

USPC ............................................. 398/45, 104, 105
See application file for complete search history.

(56) References Cited

U.S. PATENT DOCUMENTS

| | | | | |
|---|---|---|---|---|
| 4,771,229 A | | 9/1988 | Ziegler | |
| 6,157,098 A | * | 12/2000 | Kojima et al. | ................ 307/139 |

(Continued)

FOREIGN PATENT DOCUMENTS

| | | |
|---|---|---|
| CN | 1180461 A | 4/1998 |
| CN | 2904419 Y | 5/2007 |

(Continued)

OTHER PUBLICATIONS

International Search Report (ISR) (PCT Form PCT/ISA/210), in PCT/JP2012/074189, dated Oct. 23, 2012.

(Continued)

*Primary Examiner* — Dalzid Singh
(74) *Attorney, Agent, or Firm* — McGinn IP Law Group, PLLC

(57) ABSTRACT

A branching unit includes a supply destination switching section that switches one supply destination of each of a plurality of power lines that supply electric power to a unit that transfers an optical signal received from a terminal station unit through a transmission line to another supply destination corresponding to a control signal received from the terminal station unit; a current detection section that outputs a detection signal that includes information that denotes whether currents are flowing in the plurality of power lines and information that represents current directions if currents are flowing; and a monitor section that transmits a monitored result based on at least one of a plurality of detection signals received from the current detection section to the terminal station unit.

5 Claims, 3 Drawing Sheets

(56) References Cited

U.S. PATENT DOCUMENTS

| | | |
|---|---|---|
| 6,163,084 A | 12/2000 | Yamaguchi |
| 6,714,394 B1 | 3/2004 | Kumayasu et al. |
| 2004/0105136 A1* | 6/2004 | Feinberg ........................ 359/20 |
| 2004/0156602 A1* | 8/2004 | Verhaege et al. ............. 385/101 |
| 2005/0259990 A1* | 11/2005 | Yokota ............................ 398/92 |
| 2008/0310858 A1* | 12/2008 | Lu et al. ........................ 398/158 |

FOREIGN PATENT DOCUMENTS

| | | |
|---|---|---|
| GB | 2 266 202 A | 10/1993 |
| JP | 01-223830 A | 9/1989 |
| JP | 04-304716 A | 10/1992 |
| JP | 07-170233 A | 7/1995 |
| JP | 11-234179 A | 8/1999 |
| JP | 2002-057607 A | 2/2002 |
| JP | 2003-032156 A | 1/2003 |
| WO | WO 2011/151158 A1 | 12/2011 |

OTHER PUBLICATIONS

Chinese Office Action and Chinese Search Report dated Jan. 15, 2015 with an English translation thereof.

* cited by examiner

BRANCHING UNITS AND POWER LINE MONITORING METHODS

TECHNICAL FIELD

The present invention relates to branching units and power line monitoring methods that allow a supply destination of a power line connected to an optical signal transmission unit to be switched to another supply destination.

BACKGROUND ART

Patent Literature 1 discloses an example of an optical network system that transmits optical signals through submarine transmission lines. In the system disclosed in Patent Literature 1, since repeaters and branching units that transfer optical signals are located in the sea, a land terminal station causes a branching unit to switch one supply destination of a power line to another supply destination. Such a branching unit of this type is referred to as a remote control type branching unit.

RELATED ART LITERATURE

Patent Literature

Patent Literature 1: JP2002-57607A, Publication

SUMMARY OF THE INVENTION

Although the remote control type branching unit disclosed in Patent Literature 1 switches one supply destination of a power line to another supply destination corresponding to a control signal received from a land terminal station, the problem in which it cannot be confirmed whether one supply destination of a power line has been correctly switched to another supply destination will occur.

For example, even if a land terminal station causes a branching unit to switch one supply destination of a power line to another supply destination, unless the land terminal station receives an optical signal from the branching unit, the land terminal station cannot narrow down the cause, namely whether or not defective or no electric power is supplied to the optical signal transmission unit of the branching unit. If countermeasures for both cases are taken, cost and time for the countermeasures will increase.

An exemplary object of the invention is to provide branching units and power line monitoring methods that allow one supply destination of a power line switched to another supply destination by remote control to be confirmed.

A branching unit according to an exemplary aspect of the invention includes a supply destination switching section switching one supply destination of each of a plurality of power lines that supply electric power to a unit that transfers an optical signal received from a terminal station unit through a transmission line to another supply destination corresponding to a control signal received from the terminal station unit; a current detection section outputting a detection signal that includes information that denotes whether currents are flowing in the plurality of power lines and information that represents current directions if the currents are flowing; and a monitor section transmitting a monitored result based on at least one of a plurality of detection signals received from the current detection section to the terminal station unit.

A power line monitoring method according to an exemplary aspect of the invention is a power line monitoring method for a branching unit that switches one supply destination of each of a plurality of power lines that supply electric power to a unit that transfers an optical signal received from a terminal station unit through a transmission line to another supply destination, including switching one supply destination of each of the plurality of power lines to another supply destination corresponding to a control signal received from the terminal station unit; detecting whether or not currents are flowing in the plurality of power lines and their directions if the currents are flowing; and transmitting a monitored result based on information that denotes whether or not currents are flowing and information that represents the current directions for at least one of the plurality of power lines to the terminal station unit.

DETAILED DESCRIPTION OF THE EXEMPLARY EMBODIMENT

Figure 1:
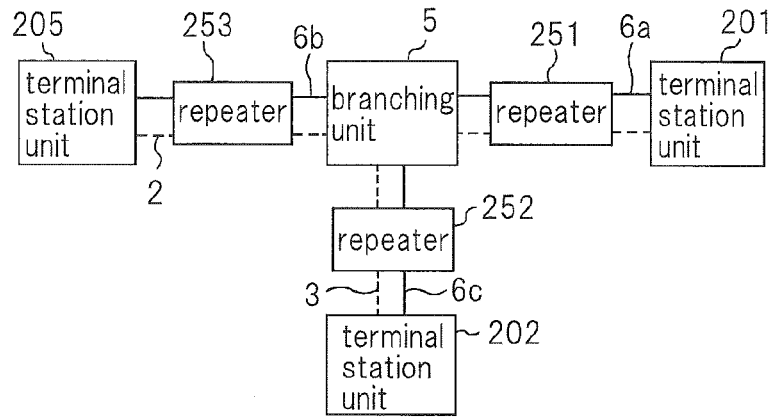
FIG. 1 is a block diagram showing an example of the structure of an optical network system including a branching unit according to an embodiment of the present invention.

Next, the structure of a branching unit according to an embodiment of the present invention will be described. FIG. 1 is a block diagram showing an example of the structure of an optical network system including the branching unit according to an embodiment of the present invention.

As shown in FIG. 1, the optical network system has terminal station units 201, 202, and 205 that are located on the land; branching unit 5 that combines or branches optical signal(s); and repeaters 251 to 253 that repeat optical signals. The number of terminal station units, the number of branching units, and the number of repeaters are examples, not limited to those shown in FIG. 1.

Branching unit 5 is connected to terminal station unit 201 and terminal station unit 205 through transmission line that transmits an optical signal. Repeaters 251 and 253 that amplify attenuated optical signals and transfer the amplified optical signals, are located on transmission line 2. Power line 6a is located between terminal station unit 201 and branching unit 5 through repeater 251 along transmission line 2. Power line 6b is located between terminal station unit 205 and branching unit 5 through repeater 253 along transmission line 2.

Branching unit 5 is connected to terminal station unit 202 through transmission line 3 that transmit an optical signal. Repeater 252 is located on transmission line 3. Power line 6c is located between terminal station unit 202 and branching unit 5 through repeater 252 along transmission line 3.

Figure 2:
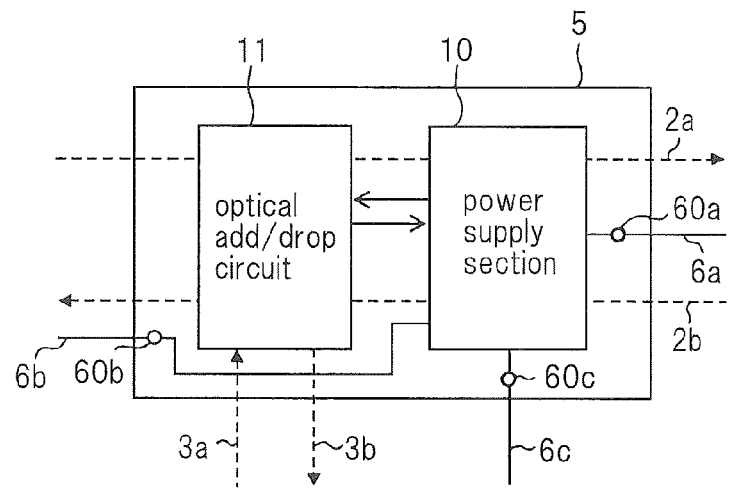
FIG. 2 is a block diagram showing an example of the structure of the branching unit shown in FIG. 1.

FIG. 2 is a block diagram showing an example of the structure of the branching unit shown in FIG. 1.

As shown in FIG. 2, branching unit 5 has optical add/drop circuit 11 that combines or branches optical signal(s); and power supply section 10 that switches one supply destination of a power line to another supply destination. Power supply section 10 has power supply terminals 60a to 60c. Power supply terminal 60a is connected to power line 6c. Power supply terminal 60b is connected to power line 6b. Power supply terminal 60c is connected to power line 6c. Power supply section 10 supplies electric power to members located in branching unit 5. In FIG. 2, currents that flow from power supply section 10 to optical add/drop circuit 11 are represented by arrows.

As shown in FIG. 2, an optical signal that is output from terminal station unit 205 through transmission line 2a is transferred to terminal station unit 201 through optical add/drop circuit 11 and power supply section 10 located in branching unit 5. An optical signal that is output from terminal station unit 201 through transmission line 2b is transferred to terminal station unit 205 through power supply section 10 and optical add/drop circuit 11 located in branching unit 5. An optical signal that is output from terminal station unit 202 is transferred to optical add/drop circuit 11 through transmission line 3a. An optical signal that is output from optical add/drop circuit 11 to terminal station unit 202 is transmitted through transmission line 3b.

Figure 3:
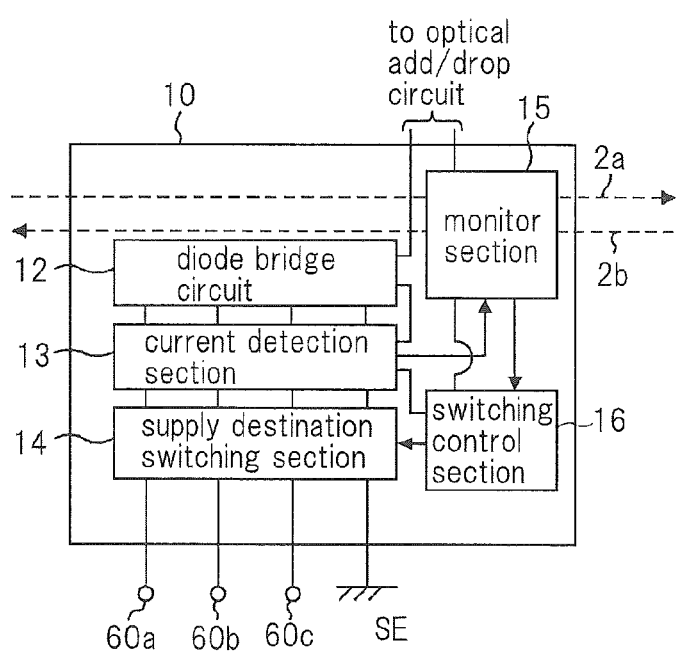
FIG. 3 is a block diagram showing an example of the structure of a power supply section shown in FIG. 2.

FIG. 3 is a block diagram showing an example of the structure of the power supply section shown in FIG. 2.

As shown in FIG. 3, power supply section 10 has diode bridge circuit 12 that arranges the directions of currents that flow in the power lines; current detection section 13 that detects currents that flow in the power lines; supply destination switching section 14 that includes relays each of which switches one supply destination of a power line to another supply destination; switching control section 16 that causes supply destination switching section 14 to switch one relay contact to another relay contact corresponding to a control signal; and monitor section 15 that monitors currents detected by current detection section 13 and their directions.

Power lines that extend from diode bridge circuit 12 are connected to optical add/drop circuit 11 shown in FIG. 2 and then diode bridge circuit 12 through monitor section 15, switching control section 16 and current detection section 13 shown in FIG. 3. This structure allows electric power to be supplied to sensors (described later) located in current detection section 13. Branching unit 5 has a total of four branches that are composed of three power lines connected to power supply terminals 60a to 60c and sea earth (SE). Supply destination switching section 14 switches one relay contact to another relay contact so as to pair two of the four branches. Diode bridge circuit 12 supplies electric power through two of the four branches such that the directions of currents that flow in optical add/drop circuit 11, monitor section 15, and switching control section 16 become constant regardless of the polarity of electric power supplied from the terminal station unit.

Current detection section 13 is located between supply destination switching section 14 and diode bridge circuit 12. Current detection section 13 monitors currents that flow in diode bridge circuit 12 and transmits a detection signal that includes information denoting whether currents are flowing and information that represents the directions of currents if they are flowing to monitor section 15. Monitor section 15 separates a control signal from an optical signal received from terminal station unit 205 through transmission line 2a and transfers the control signal to switching control section 16. In addition, monitor section 15 converts information of the monitored result based on the detection signal received from current detection section 13 into an optical signal and transmits it to terminal station unit 205 through transmission line 2b.

Switching control section 16 transfers a command signal, which causes one relay contact to be switched to another relay contact, to a relay located in supply destination switching section 14, corresponding to the control signal received from monitor section 15. Since part of the structure of switching control section 16 is disclosed in Patent Literature 1, a detailed description thereof will be omitted. For example, supply destination switch 4r described in Patent Literature 1 corresponds to switching control section 16 and supply destination switching section 14 according to this embodiment. Switching control section 16 according to this embodiment is not limited to the structure disclosed in Patent Literature 1.

According to this embodiment, monitor section 15 sends back information of the monitored result to terminal station unit 205 through transmission line 2b. Alternatively, monitor section 15 may send back information of the monitored result to terminal station unit 201 through transmission line 2a. In the structures shown in FIG. 1 to FIG. 3, transmission line 2a is connected from terminal station unit 205 to terminal station unit 201 through branching unit 5. Alternatively, transmission line 2a that is connected to terminal unit 205 may be folded back thereto at branching unit 5. In this case, monitor section 15 sends back information of the monitored result to terminal station unit 205 through transmission line 2a through which monitor section 15 receives the control signal from terminal station unit 205.

According to this embodiment, branching unit 5 has optical add/drop circuit 11. Alternatively, branching unit 5 may not have an optical add/drop circuit, but may have another structure.

Figure 4:
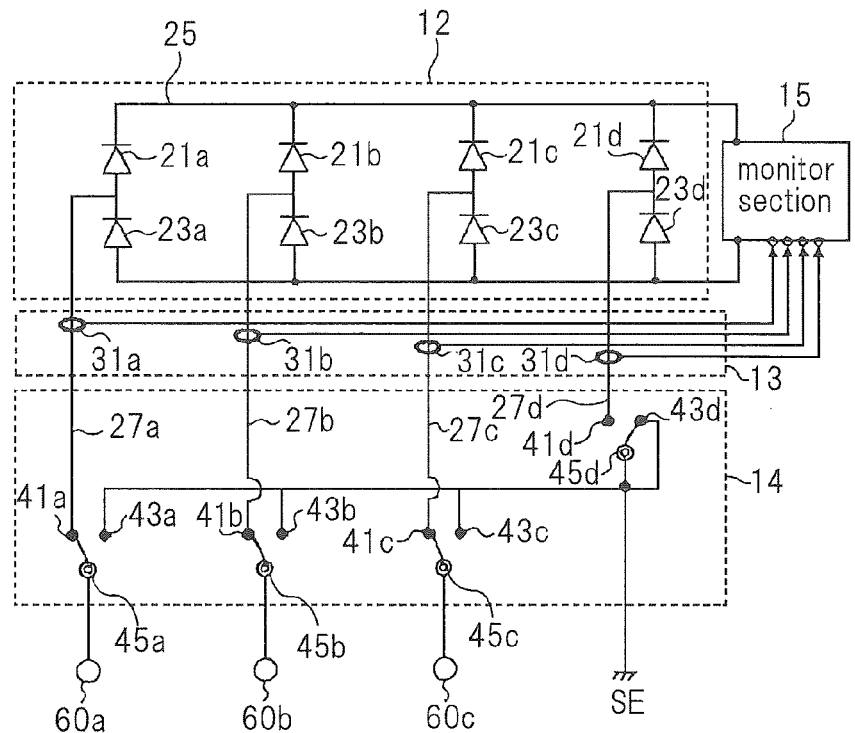
FIG. 4 is a schematic diagram describing the structure that monitors power lines according to an embodiment of the present invention.

Next, the structure of the rest (other than switching control section 16) of the power supply section shown in FIG. 3 will be described in detail. FIG. 4 is a schematic diagram describing the structure that monitors power lines according to this embodiment.

FIG. 4 shows the structure of part of power supply section 10. In FIG. 4, showing power lines that supply electric power to optical add/drop circuit 11 shown in FIG. 2, is omitted, and showing switching control section 16 and current detection section 13 shown in FIG. 3, is omitted.

Diode bridge circuit 12 has diodes 21a to 21d and 23a to 23d. Diodes 21a and 23a are connected in series to power line 25 connected to monitor section 15. Diodes 21b and 23b that are connected in series, diodes 21c and 23c that are connected in series, and diodes 21d and 23d that are connected in series are connected to diodes 21a and 23a that are connected in series.

Power line 27a is connected between diode 21a and diode 23a. Power line 27b is connected between diode 21b and diode 23b. Power line 27c is connected between diode 21c and diode 23c. Power line 27d is connected between diode 21d and diode 23d. These power lines 27a to 27c are located in branching unit 5.

Supply destination switching section 14 has relays 45a to 45d. One terminal of relay 45d is connected to SE; and the other terminal thereof can be connected to contact 41d or contact 43d. Contact 41d is connected to power line 27d. Contact 43d is connected to SE. On terminal of relay 45a is connected to power supply terminal 60a; and the other terminal thereof can be connected to contact 41a or contact 43a. Contact 41a is connected to power line 27a.

One terminal of relay 45b is connected to power supply terminal 60b; and the other terminal thereof can be connected to contact 41b or contact 43b. Contact 41b is connected to power line 27b. One terminal of relay 45c is connected to power supply terminal 60c; and the other terminal thereof can be connected to contact 41c or contact 43c. Contact 41c is connected to power line 27c. Contacts 43a to 43c are connected to SE.

Thus, relay 45a connects power supply terminal 60a to power line 27a or SE corresponding to the command signal. Relay 45b connects power supply terminal 60b to power line 27b or SE corresponding to the command signal. Relay 45c connects power supply terminal 60c to power line 27c or SE corresponding to the command signal. Relay 45d connects power line 27d to SE or keeps a state in which power line 27d is not connected to SE, according to the command signal.

As shown in FIG. 4, current detection section 13 is located between diode bridge circuit 12 and supply destination switching section 14 so as to monitor currents that are flowing in power lines 27a to 27d. Current detection section 13 has sensors 31a to 31d.

Sensor 31a is located on power line 27a. Sensor 31b is located on power line 27b. Sensor 31c is located on power line 27c. Sensor 31d is located on power line 27d. Each of sensors 31a to 31d has a resistor connected in series to the relevant power line. Each of sensors 31a to 31d detects the potential of the predetermined length on the relevant power line and transmits a detection signal including information that represents the current value and its direction to monitor section 15.

Figure 5:
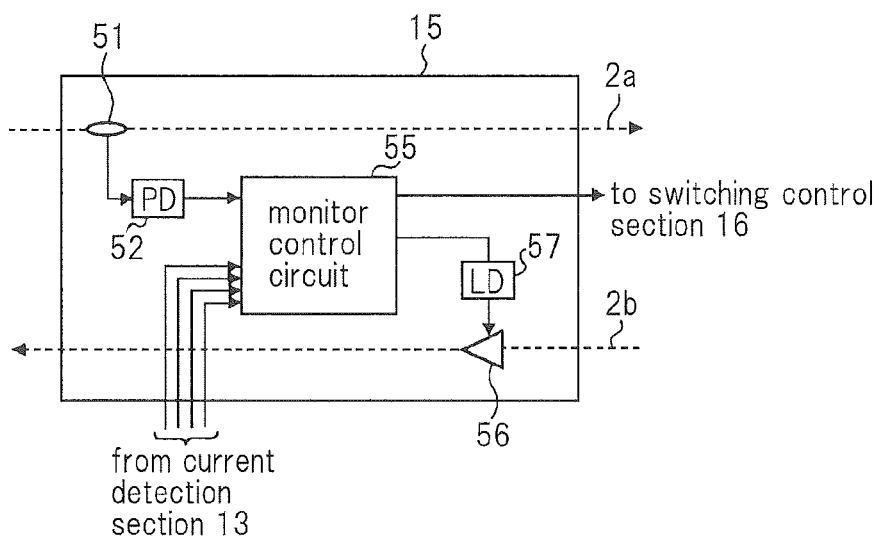
FIG. 5 is a block diagram showing an example of the structure of a monitor section shown in FIG. 3.

FIG. 5 is a block diagram showing an example of the structure of the monitor section shown in FIG. 3.

As shown in FIG. 5, monitor section 15 has photo coupler 51 that branches a predetermined optical signal from those transmitted through transmission line 2a; photo diode (PD) 52 that converts the optical signal that is input from photo coupler 51 into an electric signal; monitor control circuit 55 that outputs information of the monitored result based on the detection signal received from current detection section 13; laser diode (LD) 57 that converts the electric signal that is input from monitor control circuit 55 into an optical signal; and optical amplifier 56 that outputs the optical signal that is input from laser diode 57 to transmission line 2b.

Photo coupler 51 extracts an optical signal containing a control signal from those that are input through transmission line 2a and transmits the extracted optical signal to PD 52. PD 52 converts the optical signal that is received from photo coupler 51 into an electric signal as a control signal. PD 52 outputs the control signal to monitor control circuit 55.

Monitor control circuit 55 is, for example, a semiconductor integrated circuit. Alternatively, monitor control circuit 55 may be a gate array. Alternatively, monitor control circuit 55 may be a CPU (Central Processing Unit). When monitor control circuit 55 receives the control signal from PD 52, monitor control circuit 55 transfers the control signal to switching control section 16. In addition, monitor control circuit 55 holds information of the control signal in memory (not shown) and reads information that represents the current value and its direction from the detection signal of the relevant sensor corresponding to the control signal of those received from sensors 31a to 31d. Thereafter, monitor control circuit 55 transfers an electric signal that represents the monitored result including the information of the current value and its direction if it is flowing to LD 57. If the information that represents the current value included in the monitored result is a value close to 0, the terminal station unit can determine that no current is flowing. If the information represents that the current value is equal to or greater than the predetermined threshold, the terminal station unit can determine that current is flowing.

LD 57 modulates the electric signal received from monitor control circuit 55 with an excited light source of optical amplifier 56 and outputs the resultant optical signal to transmission line 2b through optical amplifier 56.

Next, specific examples of the control signal, the command signal, the detection signal, and the information of the monitored result will be described.

In the structure shown in FIG. 4, if the control signal causes power supply terminal 60c to be connected to SE, the command signal that switching control section 16 transmits to relay 45c causes the contact of relay 45c to be switched from contact 41c to contact 43c. The detection signal that is output from sensor 31c denotes that the current value is close to 0. The information of the monitored result denotes that no current is flowing in power line 6c connected to power supply terminal 60c.

According to this embodiment, as shown in FIG. 5, monitor section 15 receives an optical signal including a control signal through transmission line 2a and transmits the optical signal including information of the monitored result through transmission line 2b. Alternatively, monitor section 15 may transmit and receive an optical signal through transmission lines 3a and 3b as well as transmission lines 2a and 2b. In this case, even if a defect occurs in any pair of transmission lines 2a and 2b and transmission lines 3a and 3b, one supply destination of a power line can be switched to another supply destination and power lines can be monitored using the other pair of transmission lines.

Sensors 31a to 31d located in current detection section 13 may be magnetic sensors such as non-contact type MR (Magnetic Resistance) sensors or Hale elements.

Next, with reference to FIG. 4 and FIG. 5, the operation of branching unit 5 according to this embodiment will be described.

As shown in FIG. 4, the contact of relay 45a is connected to contact 41a. The contact of relay 45b is connected to contact 41b. The contact of relay 45c is connected to contact 41c. The contact of relay 45d is connected to contact 43d. In this state, it is assumed that the contact of relay 45c is switched from contact 41c to contact 43c. In addition, it is assumed that the potential of power line 6a connected to terminal station unit 201 is positive and that the potential of power line 6b connected to terminal station unit 205 is negative.

Figure 6:
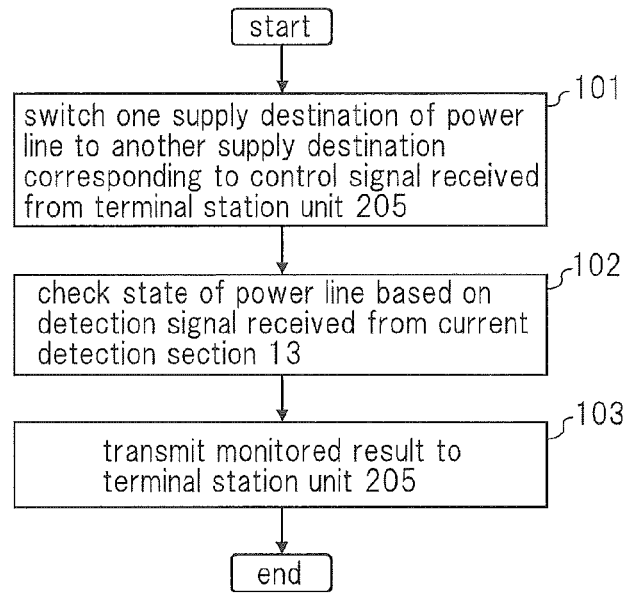
FIG. 6 is a flow chart showing a procedure for a power line monitoring method according to an embodiment of the present invention.

FIG. 6 is a flow chart showing an example of the procedure of the power line monitoring method according to an embodiment of the present invention.

Terminal station unit 205 transmits an optical signal, which includes a control signal that causes power supply terminal 60c to be connected to SE, to branching unit 5 through transmission line 6b, according to a command that the user inputs. When monitor section 15 of branching unit 5 receives the optical signal from terminal station unit 205 and extracts the control signal from the optical signal, monitor section 15 holds the control signal in monitor control circuit 55 and transfers the control signal to switching control section 16. When switching control section 16 receives the control signal from monitor section 15, switching control section 16 transfers a command signal that causes the contact of relay 45c to be switched from contact 41c to contact 43c. Relay 45c switches its contact from contact 41c to contact 43c corresponding to the command signal received from switching control section 16 (at step 101).

Current flows from terminal station unit 201→power line 6a→power supply terminal 60a→power line 27a→diode 21a→monitor section 15→diode 23b→power line 27b→power supply terminal 60b→terminal station unit 205. Sensor 31a transfers the detection signal, that includes the information that represents the current value of power line 27a and information that denotes that the direction of current that flows in power line 27a is the direction from power supply terminal 60a to diode bridge circuit 12, to monitor section 15. Sensor 31b transfers the detection signal, that includes the information that represents the current value of power line 27b and information that denotes that the direction of current that flows in power line 27b is the direction from diode bridge circuit 12 to power supply terminal 60b, to monitor section 15.

On the other hand, since power supply terminal 60c is connected to SE through relay 45c, no current flows in power line 27c. Thus, sensor 31c transfers the detection signal that includes the information that represents the current value that is close to 0 to monitor section 15. In this case, the detection signal of sensor 31d is the same as that of sensor 31c.

When monitor control circuit 55 of monitor section 15 receives the detection signals from sensors 31a to 31d, monitor control circuit 55 checks the states of the power lines corresponding to the control signals that have been held (at step 102). In this case, it is assumed that monitor control circuit 55 reads information of the detection signal received from sensor 31c for power line 27c connected to power supply terminal 60c and obtains the monitored result that is information denoting that no current is flowing in power line 27c. Thereafter, monitor control circuit 55 transfers an electric signal of the information of the monitored result to LD 57 so as to send back the monitored result to terminal station unit 205 (at step 103). After LD 57 converts the electric signal of the information of the monitored result into an optical signal, LD 57 transmits the optical signal to terminal station unit 205 through optical amplifier 56 and transmission line 2b.

Since monitor section 15 sends back as the monitored result information of the detection signal for the power line whose supply destination was caused to be switched to another supply destination corresponding to the control signal to terminal station unit 205, the operator of terminal station unit 205 can confirm whether or not one supply destination of the power line has been switched to another supply destination as commanded.

According to this embodiment, when monitor section 15 receives the control signal from a terminal station unit, monitor section 15 sends back the monitored result of the power line corresponding to the control signal to the terminal station unit. Alternatively, monitor section 15 may send back not only the detection signal of sensor 31c that monitors power line 27c corresponding to the control signal, but also the detection signals received from sensors 31a and 31b that detect currents. For example, at step 102 shown in FIG. 6, monitor control circuit 55 may send back as the monitored result the current value of power line 27a and its direction, the current value of power line 27b and its direction, and information that denotes that no current is flowing in power line 27c. Alternatively, monitor control circuit 55 may send back as the monitored result information of detection signals received from sensors 31a to 31d. In these cases, the operator of terminal station unit 205 can confirm the states of power lines other than the one whose supply destination was caused to be switched to another supply destination.

There may be two types of control signals, one of which causes one supply destination of a power line to be switched to another supply destination (hereinafter this control signal is referred to as "first control signal") and the other of which causes information that represents current monitored by current detection section 13 to be transmitted (hereinafter this control signal is referred to as "second control signal"). This embodiment represents a case in which the control signal is the first control signal. As described above, monitor control circuit 55 can switch one supply destination of a power line to another supply destination and send back the monitored result of the current value at the same time. If the control signal is the second control signal, monitor control circuit 55 does not transfer the second control signal to switching control section 16, but sends back the monitored result of the power line corresponding to the second control signals to the terminal station units.

According to this embodiment, monitor control circuit 55 sends back the monitored result to the terminal station units corresponding to the second control signal. Alternatively, monitor control circuit 55 may not send back the monitored result to the terminal station units corresponding to the first control signal. In this case, a photo coupler (not shown) that separates the first control signal from the optical signal received through transmission line 2a and a PD (not shown) that converts the optical signal including the first control signal into an electric signal may be newly located so as to extract the first control signal from the optical signal and transfer the first control signal to switching control section 16. In the structure shown in FIG. 5, photo coupler 51 and PD 52 may serve to extract the second control signal from the optical signal and transfer the second control signal to monitor control circuit 55.

Alternatively, monitor section 15 may receive the monitored results based on the detection signals of sensors 31a to 31d from current detection section 13 regardless of whether monitor section 15 receives the control signal at intervals of a predetermined period of time and transmit the monitored result to terminal station unit 205. In this case, if a defect occurs on the cable of a power line, monitor section 15 notifies terminal station unit 205 of the defect.

Figure 7:
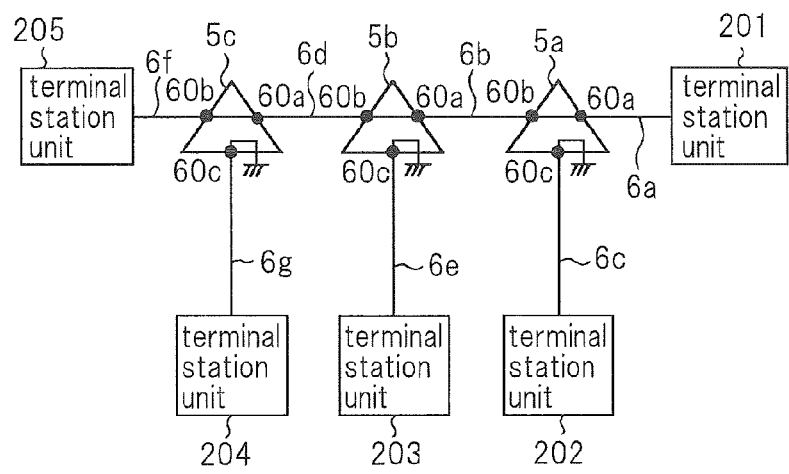
FIG. 7 is a schematic diagram showing an example of the structure of a power supply method.
Figure 8:
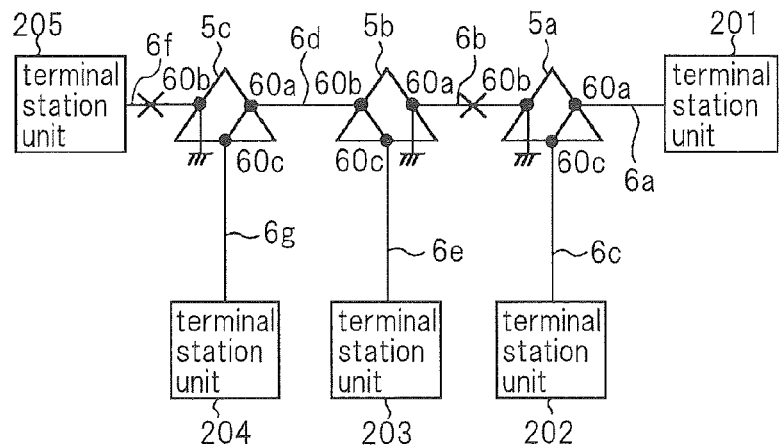
FIG. 8 is a schematic diagram showing another example of the structure of the power supply method.

Next, the method for switching one supply destination of a power line to another supply destination and the method for monitoring power lines will be specifically described. FIG. 7 and FIG. 8 are schematic diagrams showing examples of the structure of a power supply method for an optical network system.

FIG. 7 and FIG. 8 show that three branching units 5a to 5c are located between terminal station unit 201 and terminal station unit 205. The structure of each of branching units 5a to 5c is the same as that of branching unit 5 described with reference to FIG. 2 to FIG. 5. Terminal station unit 202 is connected to branching unit 5a. Terminal station unit 203 is connected to branching unit 5b. Terminal station unit 204 is connected to branching unit 5c. In FIG. 7, transmission lines and repeaters are omitted.

In branching unit 5a shown in FIG. 7, power supply terminal 60a is connected to power supply terminal 60b through power lines 27a and 27b and diode bridge circuit 12. Power supply terminal 60c is connected to SE. Likewise, in branching units 5b and 5c, power supply terminal 60a is connected to power supply terminal 60b through power lines 27a and 27b and diode bridge circuit 12. Power supply terminal 60c is connected to SE.

Terminal station unit 201 and branching unit 5a are connected through power line 6a.

Branching unit 5a and branching unit 5b are connected through power line 6b. Branching unit 5b and branching unit 5c are connected through power line 6d. Branching unit 5c and terminal station unit 205 are connected through power line 6f. Electric power can be supplied to branching units 5a to 5c from either terminal station unit 201 or terminal station unit 205.

In the power supply structure of the optical network system shown in FIG. 7, a terminal station unit can monitor that electric power supplied to branching units 5a to 5c is "power supply terminal 60a—power supply terminal 60b" corresponding to the control signal received from another terminal station unit.

FIG. 8 shows a case in which, cables of power lines 6f and 6b in the optical network system shown in FIG. 7 become defective, electric power cannot be supplied therethrough, and then supply destinations of the supply lines are switched to other supply destinations. In this example, for simply explaining, it is assumed that transmission lines 2 and 3 shown in FIG. 1 are free of abnormality.

Terminal station unit 205 transmits an optical signal, which includes a control signal that causes power supply terminal 60b to be connected to SE and power supply terminal 60a to be connected to power supply terminal 60c, to branching unit 5c through transmission line 6f, and terminal station unit 205 also transmits an optical signal containing a control signal that represents the same command content to branching unit 5a through transmission lines 6f, 6d, and 6b, according to a command that the operator inputs. Branching units 5c and 5a switch the contact of relay 45b from contact 41b to contact 43b and the contact of relay 45c from contact 43c to contact 41c corresponding to the control signal received from terminal station unit 205.

When monitor section 15 of each of branching units 5c and 5a receives the detection signals of sensors 31a to 31d from current detection section 13, monitor section 15 converts an electric signal of information that represents the current value of power line 27c, information that represents the current direction, and information that denotes that no current is flowing in power line 27b into an optical signal and transmits it to terminal station unit 205.

On the other hand, terminal station unit 205 transmits an optical signal including a control signal that causes power supply terminal 60a to be connected to SE and power supply terminal 60b to be connected to power supply terminal 60c, to branching unit 5c through transmission lines 6f and 6d, according to a command that the operator inputs. Branching unit 5b switches the contact of relay 45a from contact 41a to contact 43a and the contact of relay 45c from contact 43c to contact 41c corresponding to the control signal received from terminal station unit 205. When monitor section 15 of branching unit 5b receives the detection signals of sensors 31a to 31d from current detection section 13, monitor section 15 converts an electric signal of information of the monitored result including information that represents the current value of power line 27c and information that denotes that no current is flowing in power line 27a into an optical signal and transmits it to terminal station unit 205.

In the power supply structure of the optical network system shown in FIG. 8, each terminal station unit can monitor that electric power of "power supply terminal 60a—power supply terminal 60c" is supplied to branching units 5a and 5c and that electric power of "power supply terminal 60b—power supply terminal 60c" is supplied to branching unit 5b, according to the control signal received from each terminal station unit.

In the structures shown in FIG. 7 and FIG. 8, branching units 5a to 5c can transmit and receive control signals and monitored results to and from terminal station units 201 and 205. In addition, branching unit 5a may transmit and receive control signals and monitored results to and from terminal station unit 202. In addition, branching unit 5b can transmit and receive control signals and monitored results to and from terminal station unit 203. In addition, branching unit 5c can transmit and receive control signals and monitored results to and from terminal station unit 204. In these cases, even if defects occur in cables of power line 6b and power line 6f, terminal station units 202 to 204 can monitor the power supply structures of the branching units in such a manner that terminal station units 202 to 204 transmit control signals to branching units 5a to 5c, receive the monitored results therefrom, and display the monitored results.

According to this embodiment, even if remote control type branching units are used, each terminal station unit can confirm the current power supply structure of the optical network system by monitoring the states of the power lines in the branching units. Thus, if a cable defect occurs and a branching unit is remotely caused to switch one supply destination of a power line to another supply destination, each terminal station unit can confirm whether or not the branching unit has correctly switched one supply destination of a power line to another supply destination.

The branching units and the power line monitoring methods according to the present invention can be applied to a wavelength multiplexing optical transmission system and an optical network system.

As an example of the effect of the present invention, each land terminal station can confirm that a branching unit has correctly switched one supply destination of a power line to another supply destination.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2011-281354 filed on Dec. 22, 2011, the content of which is incorporated by reference.

DESCRIPTION OF REFERENCE NUMERALS

5 Branching unit
10 Power supply section
12 Diode bridge circuit
13 Current detection section
14 Supply destination switching section
15 Monitor section
16 Switching control section

The invention claimed is:

1. A branching unit, comprising:
a supply destination switching section switching one supply destination, corresponding to a control signal received from a terminal station unit, of each power line of a plurality of power lines, that supply electric power to a unit that transfers an optical signal received from said terminal station unit through a transmission line to another supply destination;
a current detection section outputting a detection signal that includes information that denotes whether or not currents are flowing in said plurality of power lines and information that represents current directions if currents are flowing; and
a monitor section transmitting a monitored result based on at least one of a plurality of detection signals received from said current detection section to said terminal station unit.

2. The branching unit according to claim 1,
wherein when said monitor section receives said control signal from said terminal station unit, said monitor section transmits information of a detection signal, corresponding to a power line whose supply destination is caused to be switched to another supply destination corresponding to said control signal, from among said plurality of power lines, as said monitored result, to said terminal station unit.

3. The branching unit according to claim 2,
wherein said monitor section transmits the information of said plurality of detection signals as said monitored result to said terminal station unit at intervals of a predetermined period of time.

4. The branching unit according to claim 1,
wherein said monitor section transmits the information of said plurality of detection signals as said monitored result to said terminal station unit at intervals of a predetermined period of time.

5. A power line monitoring method for a branching unit that switches one supply destination of each of a plurality of power lines that supply electric power to a unit that transfers an optical signal received from a terminal station unit through a transmission line to another supply destination, comprising:
   switching one supply destination of each of said plurality of power lines to another supply destination corresponding to a control signal received from said terminal station unit;
   detecting whether or not currents are flowing in said plurality of power lines and their directions if currents are flowing; and
   transmitting a monitored result based on information that denotes whether or not currents are flowing and information that represents said current directions for at least one of said plurality of power lines to said terminal station unit.

* * * * *